ISAAC S. SHEETS, OF TROY, OHIO.

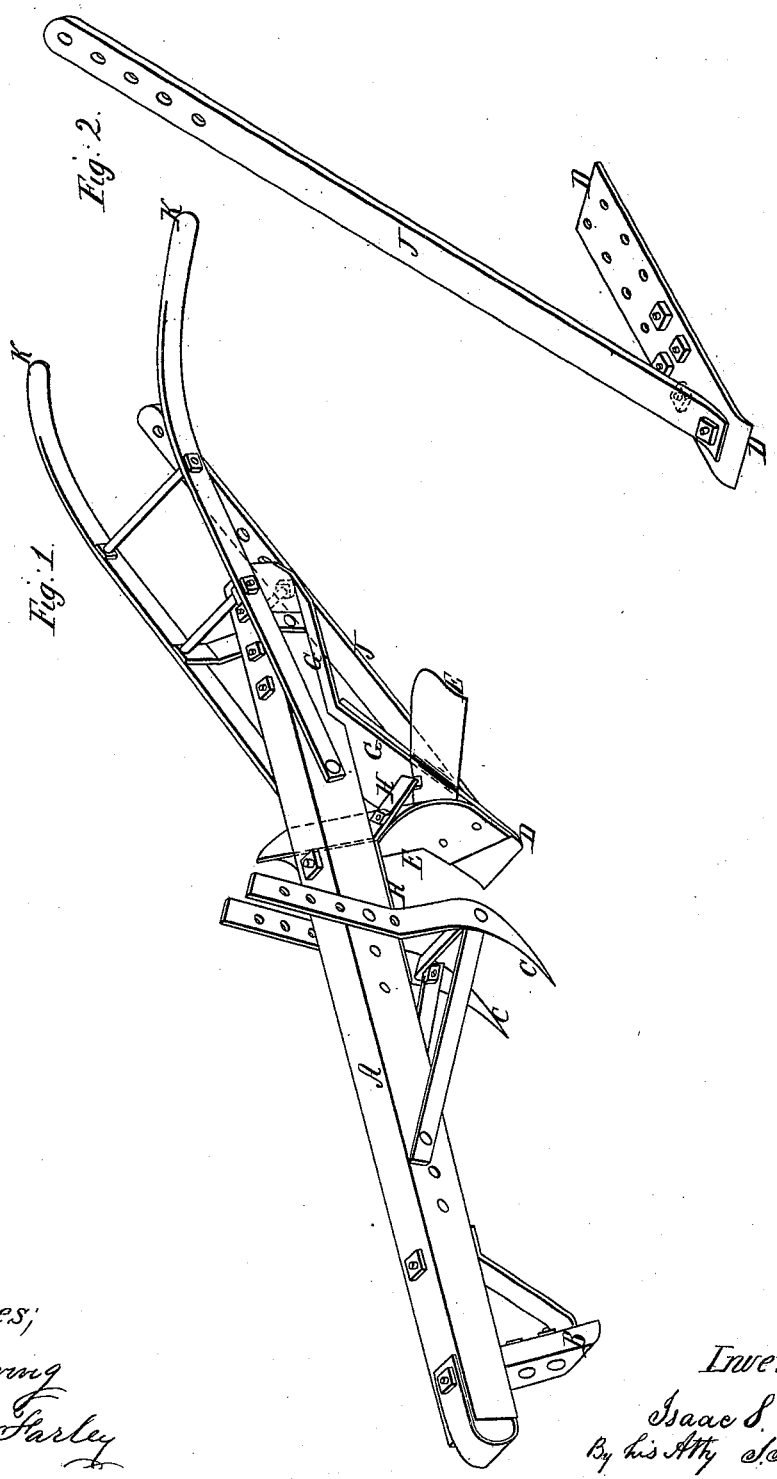

Letters Patent No. 86,947, dated February 16, 1869.

IMPROVEMENT IN DITCHING-PLOW.

The Schedule referred to in these Letters Patent and making part of the same.

*To all whom it may concern:*

Be it known that I, ISAAC S. SHEETS, of Troy, Miami county, State of Ohio, have invented an "Improved Ditching-Plow;" and I do hereby declare the following to be an exact description of the same, reference being had to the accompanying drawings, and to the letters of reference marked thereon, making a part of this specification, in which—

Figure 1 represents a perspective view of the ditching-plow.

Figure 2 is the reverse side of the plow-plate and brace, showing how they are bolted and fastened to the front bed-plate and rear of beam.

The nature of my invention consists in the construction of the plow-plate adjusted upon a bed-plate, and arranged with side wings or mould-boards, to throw off the dirt on either or both sides, the plow being combined with an adjustable incline brace behind, that is adjusted (to correspond with the raising and lowering of the plow) at the rear end of the beam.

A represents the beam of the ditching-machine, with a runner, B, in front, that assists in guiding the course of the plow.

Another runner may be placed in the rear, if necessary, to give a regular and even motion to the plow, according to the depth of the ditching.

C C are the cutters in front of the plow, that are adjusted (by bolts) on each side of the beam, so as to be raised or lowered, and their depth regulated as required, according to the character of the soil.

The plow D furrows from four to eight inches, and the wings E E throw off the ground on each side of the furrow.

The plow-plate D and the wings E E are bolted to and supported by an incline bed-plate, G, that extends from near the point of the plow, on an incline, to the lower side of the beam A, where it is firmly and permanently bolted to the beam.

Immediately behind the bed-plate G is the adjustable plow-plate D, that is adjusted higher or lower by bolts extending through the bed-plate and the apertures in the plow-plate D. Thus the bed-plate G supports and strengthens the plow-plate D, and allows the plow D to be adjusted and raised higher or lower, according to the character of the soil to be ditched, and to regulate the depth of furrow.

A front brace, H, attached to the beam A, supports the wings and bed-plate G in front.

The rear brace J is a strong adjustable bar, bolted permanently to the back side of the plow D, near the point, and extends on an incline up and beyond the rear end of the beam A, and has apertures at the upper end, through which a strong bolt is passed into the end of the beam, so that the brace J may be lowered or raised with the point of the plow, and adjusted to correspond with the length of the plow and the depth of the furrow.

The depth of the furrow at first plowing is, say, from six to eight inches, the next plowing about four inches, and the third series of plowing about four inches again, and so on, according to the depth of the ditch required and the character of the soil plowed.

K K are the handles for guiding the plow.

What I claim as my invention, and desire to secure by Letters Patent, is—

The manner of adjusting the winged plow, by means of the adjustable plate D, with the brace J and with the cutters C C, two or more arranged in front, and operating as herein described, and for the purpose set forth.

ISAAC S. SHEETS.

Witnesses:
 J. FRANKLIN REIGART,
 EDM. F. BROWN.